United States Patent
Felsenthal

(10) Patent No.: US 6,467,613 B2
(45) Date of Patent: Oct. 22, 2002

(54) POCKET ASSEMBLY FOR MULTIPLE SHOE RACK BAG

(76) Inventor: Donald H. Felsenthal, 5999 Wood Trail Dr., Memphis, TN (US) 38120

( * ) Notice: Subject to any disclaimer, the term of this patent is extended or adjusted under 35 U.S.C. 154(b) by 0 days.

(21) Appl. No.: 09/732,774

(22) Filed: Dec. 11, 2000

(65) Prior Publication Data

US 2002/0071618 A1 Jun. 13, 2002

Related U.S. Application Data

(60) Provisional application No. 60/250,892, filed on May 24, 2000.

(51) Int. Cl.⁷ ............................................. B65D 81/28
(52) U.S. Cl. ......................... 206/213; 206/287; 383/39
(58) Field of Search ............................ 383/39; 206/287, 206/213

(56) References Cited

U.S. PATENT DOCUMENTS

| | | | |
|---|---|---|---|
| 1,066,265 A | | 7/1913 | Freid |
| 1,658,596 A | | 2/1928 | Goldish |
| 1,684,232 A | * | 9/1928 | Levit ........................ 190/13 F |
| 2,071,088 A | * | 2/1937 | Rottman .................... 206/278 |
| 2,591,277 A | * | 4/1952 | Mintz ......................... 206/213 |
| 2,606,636 A | * | 8/1952 | Braverman ................ 190/111 |
| 2,619,225 A | * | 11/1952 | Mintz ......................... 206/213 |
| 2,755,013 A | | 7/1956 | Beede |
| 2,801,737 A | * | 8/1957 | Derman ...................... 206/213 |
| 2,821,295 A | * | 1/1958 | Marks ......................... 206/213 |
| 2,832,389 A | * | 4/1958 | Smith ........................... 383/39 |
| 3,181,751 A | * | 5/1965 | Wilson ........................ 224/920 |
| 3,294,134 A | * | 12/1966 | Matross et al. ............. 206/287 |
| 4,134,479 A | * | 1/1979 | Crider, Jr. et al. ........... 190/49 |
| 4,585,127 A | * | 4/1986 | Benedict ....................... 211/34 |
| 4,753,342 A | * | 6/1988 | Pulichino, Jr. et al. ..... 206/291 |
| 4,923,745 A | | 5/1990 | Wolfert et al. |
| 4,960,204 A | * | 10/1990 | Young et al. ............... 190/109 |
| 5,002,183 A | | 3/1991 | Okano |
| 5,002,401 A | * | 3/1991 | Blackman .................... 150/112 |
| 5,414,975 A | * | 5/1995 | Hummel .................... 12/114.4 |
| D385,419 S | * | 10/1997 | Ibigbami ..................... D3/283 |

* cited by examiner

*Primary Examiner*—Stephen P. Garbe
(74) *Attorney, Agent, or Firm*—Peter J. Georges; William D. Breneman; Breneman & Georges

(57) ABSTRACT

A multiple shoe rack bag has a plurality of panels, at least one of which has an opening formed therein. The panels form a space enclosing at least one rack capable of containing at least one pair of shoes therein. A pocket is installed in the opening and is configured to hold a chemical composition in an interior thereof. A zipper provides access into the interior of the pocket. The pocket has a gas-impermeable front surface and a back surface perforated with vents to allow vapor from the chemical composition to pass therethrough to treat the multiple pairs of shoes enclosed in the space formed by the panels. The back surface of the pocket may be gas-impermeable. The shoe rack bag may be a rectangular hanging bag for a single pair of shoes, a rectangular hanging bag for multiple pairs of shoes, an underbed storage box or a portable shoe rack closet.

16 Claims, 5 Drawing Sheets

POCKET ASSEMBLY FOR MULTIPLE SHOE RACK BAG

CROSS-REFERENCE TO RELATED APPLICATION

This application claims the benefit of U.S. Provisional Patent Application Ser. No. 60/250,892, filed on May 24, 2000, under 35, U.S.C. 119(e).

BACKGROUND OF THE INVENTION

1. Field of the Invention

The present invention relates to a multiple shoe rack bag having a pocket for accommodating therein one or more chemical compositions, such as insecticides, deodorants, demoisturizing agents, antimicrobial agents and the like, which are effective for the protection of garments.

2. Discussion of the Prior Art

The prior art has used various methods and structures to provide access for fumigants into a garment bag. Fumigants have long been employed to protect the contents from damage by moths and the like. The best and most common fumigant for this purpose has been and continues to be paradichlorobenzene which is the typical component in moth balls.

It is known in the prior art that alternative fumigants may be used. Alternatives to paradichlorobenzene are the following insecticidal substances which may be used by themselves or in a combination with one another or with other insecticidal substances: chlorinated hydrocarbons such as lindane or methoxychlor; phosphoric acid esters such as chlorpyrifos, chlorpyrifos-methyl or dichlorvos; and pyrethroids such as vaprothrin (emphenthrin), permethrin, bioresmethrin, bioallethrin, kadethrin, decis, cyflythrin or fenfluthrin.

Examples of clothing bags that include various arrangements for holding and transferring insecticides into garment bags to protect stored clothing are described in U.S. Pat. Nos. 1,066,265 issued to Freid on Jul. 1, 1913; 1,658,596 issued to Goldish on Feb. 7, 1928; 2,755,013 issued to Beede on Jul. 17, 1956; 4,923,745 issued to Wolfert et al. on May 8, 1990; and 5,002,183 issued to Okano on Mar. 26, 1991.

In U.S. Pat. No. 5,002,183, a clothing bag is disclosed which is comprised of a gas-permeable surface sheet and a gas-impermeable back sheet. These sheets are joined together at their peripheries. A second gas-impermeable sheet is joined at its periphery to the surface sheet of the garment bag to make a pocket for accommodating a chemical therein. The garment bag described in U.S. Pat. No. 5,002,183 is the first to provide an outside pocket on a garment bag that is readily accessible and is comprised of a large permeable surface for introducing fumigants into garment bags.

SUMMARY OF THE INVENTION

In the present invention, the concept of an externally accessible pocket for introducing fumigant into a multiple shoe rack bag is used. However, the construction of the pocket is such that the need for using a bag which is comprised of a gas-permeable surface sheet is eliminated.

In accordance with the present invention, the front, back and side panels of a shoe rack bag are made of gas-impermeable material. A portion of the shoe rack bag is cut out to form an opening in the bottom front of the bag.

A pocket having (1) a perforated back surface comprised of an impermeable material and (2) an unperforated front surface also comprised of an impermeable material is used to close the opening.

The configuration and area of the opening can be varied depending on the size and the shape of the opening desired. The opening is closed by placement of a pocket thereover. The pocket, as noted above, is composed entirely of impermeable material. The front surface of the pocket includes an access means, preferably a zipper, which is preferred over Velcro® closings that have been found to be susceptible to leakage. The zipper allows access to the pocket when opened and effectively seals the front surface of the pocket when closed. The pocket has perforations which pass through the pocket back surface to allow a sublimated fumigant to travel from the pocket into the shoes racked in the bag. The degree of permeability can easily and economically be controlled by changing the size and number of perforations. Moreover, the lower part of the pocket to which the solid source for fumigant gravitates during sublimation is preferably not perforated. The small residue particles resulting from sublimation gravitate to the bottom of the pocket where such residue is collected.

In making the pocket of the present invention, the zipper is sewn into the outside nonperforated piece of polyethylene of the pocket and then such nonperforated front piece is sewn to the perforated piece which is exposed to the interior of the bag when the pocket is in place and covers the cut-out portion of the bag. The resulting pocket is then sewn into an opening cut out from any of the gas impermeable surfaces of the bag. In this regard, the pocket pouch can be sewn into any part of the bag in which the opening is made. In the case of a hanging multiple shoe rack bag, the pocket can be sewn into the front bottom. This placement allows for an area of air space to exist between the pocket and the lowermost row of shoes racked in the bag. The shoes generally are placed in flexible racks spaced along a back panel of the bag. It is believed that such placement permits greater dissemination of the chemicals so as to provide a greater degree of protection for the shoes. In underbed shoe storage boxes, the pocket may be sewn over any opening in the front, back or one or more of the sides of the underbed shoe storage box. The pocket used in the present invention can also be sewn over the openings on one or more of the sides of portable shoe racks. In fact, the pocket of the present invention can be sewn into any type of container that is used to store and protect shoes or other household articles that would benefit from being kept free of insects or other elements that can damage or impregnate the goods with offensive odors.

The pocket used in making the storage containers of the present invention is preferably constructed of polyethylene. Commonly used protective chemicals will not damage polyethylene. Specifically, moth balls and crystals of paradichlorobenzene do not damage polyethylene. Use of polyethylene or other unaffected materials for constructing the pocket permits the other surface materials of the container to be composed of plastic materials such as PVC because the chemicals retained in the pouch will not come into direct contact with the shoes inside the container.

Additionally, the pocket includes a zipper. The zipper, which is preferably metallic, opens and closes easily. It has been found that Velcro® closure devices are more cumbersome to open and close and do not provide a closure as complete as a zipper. The zipper makes it easier for the user merely to zip open and add moth balls or crystals into the pocket as old mothballs or crystals dissipate.

The pocket or pouch can also function as a holding space for other shoe care products, such as shoe shine brushes and other soil removal products, thereby keeping such products within close and readily accessible proximity to the shoes to be treated.

DETAILED DESCRIPTION OF THE INVENTION

Figure 1:
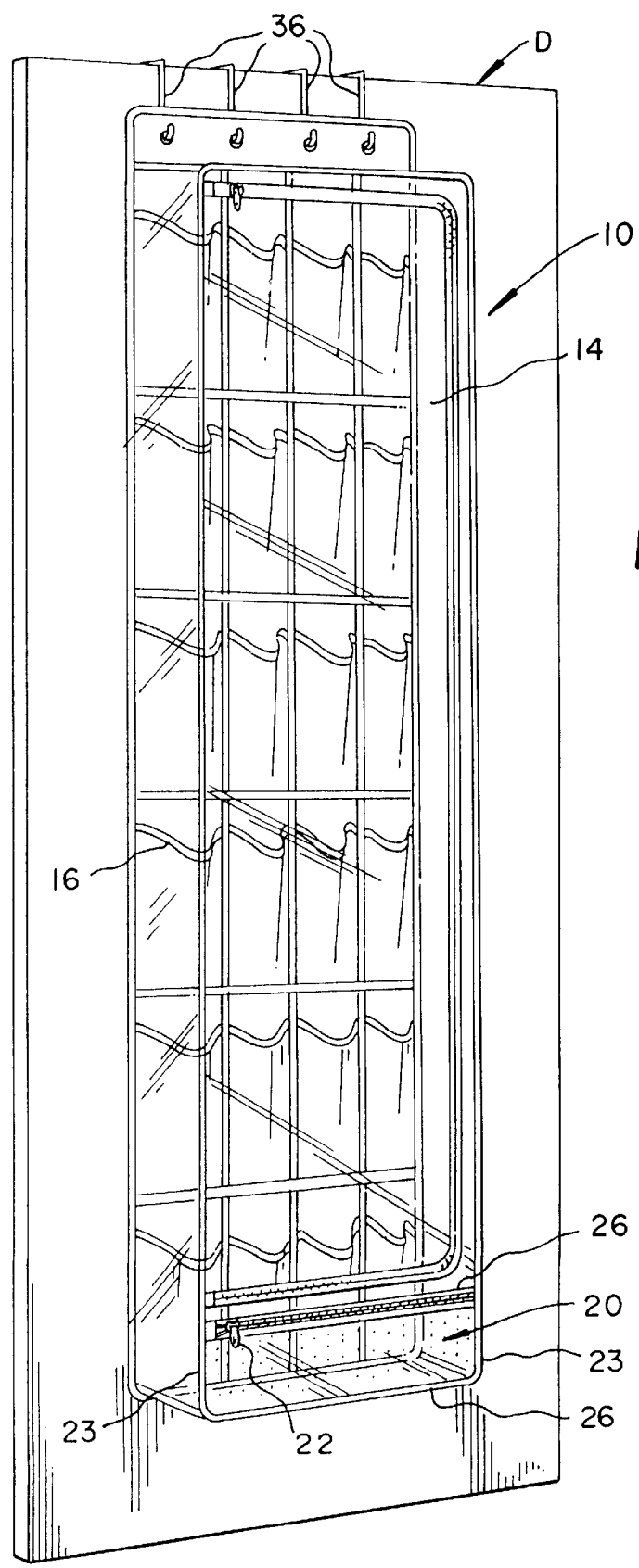
FIG. 1 is a full frontal perspective view of a hanging dozen shoe pair rack bag according to a first embodiment of the invention with a pocket installed in a bottom front panel.

In FIG. 1, there is shown a full frontal perspective view of a rectangular-shaped multiple shoe rack bag 10 of a first embodiment with a plurality of gas-impermeable panels containing a dozen pairs of flexible racks 16 for shoes suspended therein. A plurality of hooks 36, in this example four, suspend the bag 10 from the back or front of a door D. In a front panel 14 made of a gas-impermeable material such as polyethylene, there is a pocket 20 having a first zipper 22 for providing access to an interior of the pocket 20. The first zipper 22 is arranged horizontally along a top end edge 26 and extends between side edges 23. There is also a bottom end edge 26 at a base of the front panel 14. These side edges 23 are only about one-quarter to one-third as long as the end edges 26. The horizontally oriented pocket 20 is aligned in a direction perpendicular to the shoe racks 16 in the bag 10.

Figure 2:
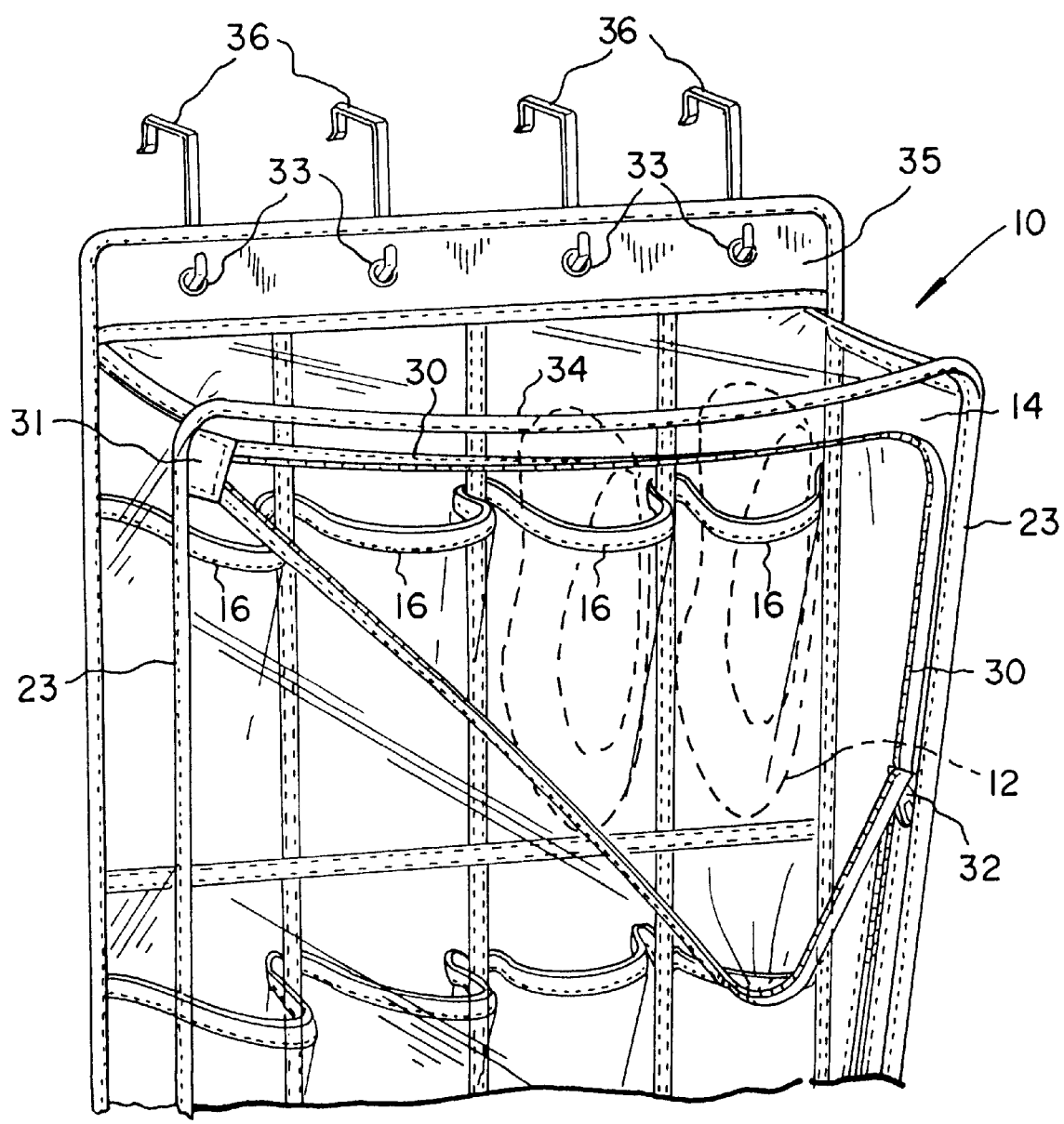
FIG. 2 is a partial upper frontal perspective view of a hanging multiple shoe rack bag according to the first embodiment with a pair of shoes shown in phantom lines in a top rack row thereof.

In FIG. 2, there is shown a partial upper frontal perspective view of the bag 10 of the first embodiment with a pair of shoes 12 placed in two of the racks 16. The bag 10 is suspended by four hooks 36 which extend through a plurality of holes 33 in a top panel 35 made of opaque textile fabric. The front panel 14 is arranged so that one of its side edges 23 runs parallel with a pathway 30 for a second zipper 32. The second zipper 32 starts its run in an upper left corner 31 between the left side edge 23 and a horizontal top edge 34. The left side edge 23 and the top edge 34 form two edges of the front panel 14. The pathway 30 for the second zipper 32 runs parallel to the top edge 34. The pathway 30 is sewn into the front panel 14 along the top edge 34 and the right side edge 23. The second zipper 32 is shown to have run partially along its pathway 30 so that access may be had to the pair of shoes 12 in the two uppermost right racks 16.

Figure 3:
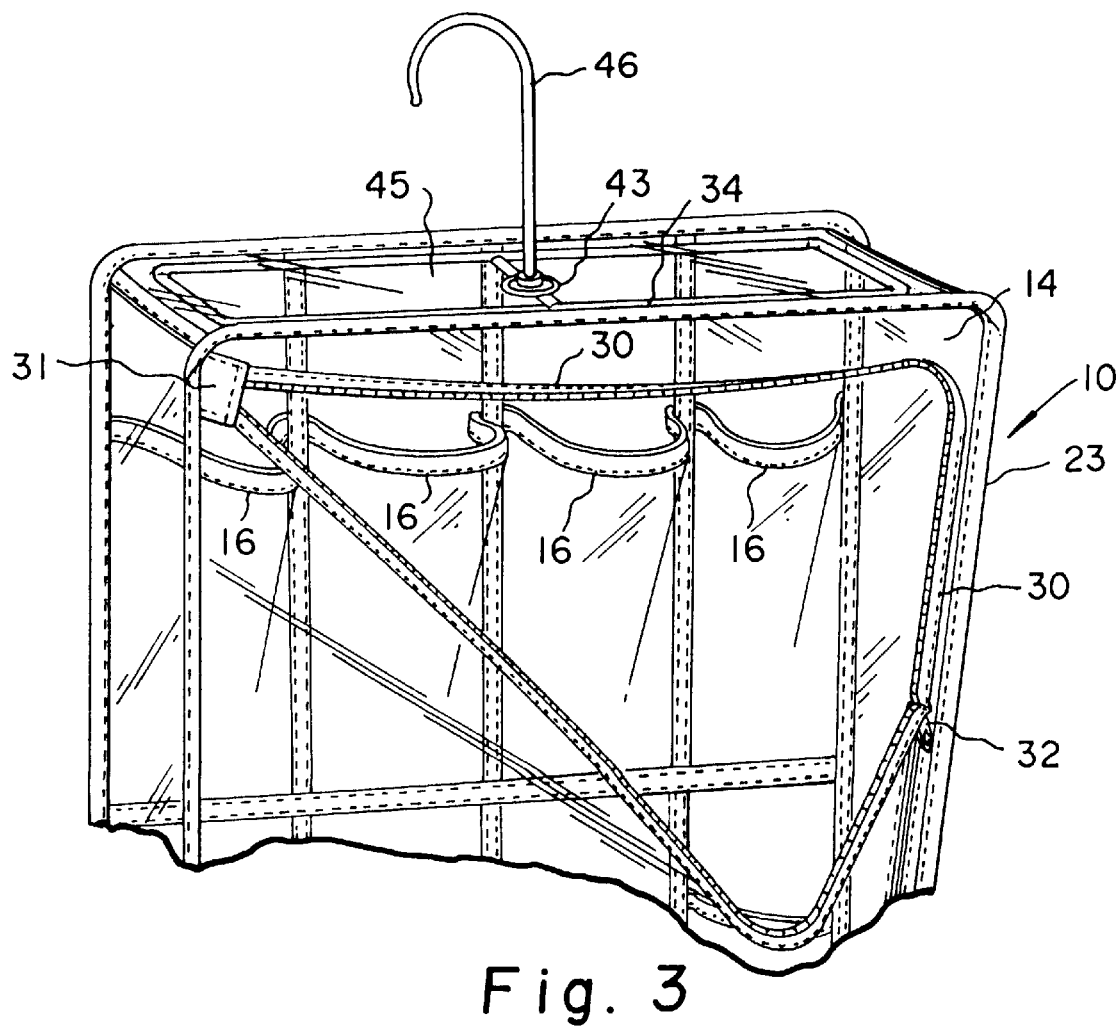
FIG. 3 is a partial upper frontal perspective view of a hanging multiple shoe rack bag according to a second embodiment with a front access panel being partly unzipped.

In FIG. 3, there is shown a partial upper frontal perspective view of the bag 10 of a second embodiment with the same plurality of flexible racks 16 for holding pairs of shoes (not shown). A single large hook 46 extends through a single hole 43 in a clear hard plastic top panel 45. The front panel 14 in this second embodiment is arranged in the same manner as the first embodiment to provide the pathway 30 for the second zipper 32 to run parallel to the top edge 34 and the right side edge 23, after starting its run from the upper left corner 31, so that a user may have access to a top row of the shoe racks 16 inside the bag 10.

Figure 4:
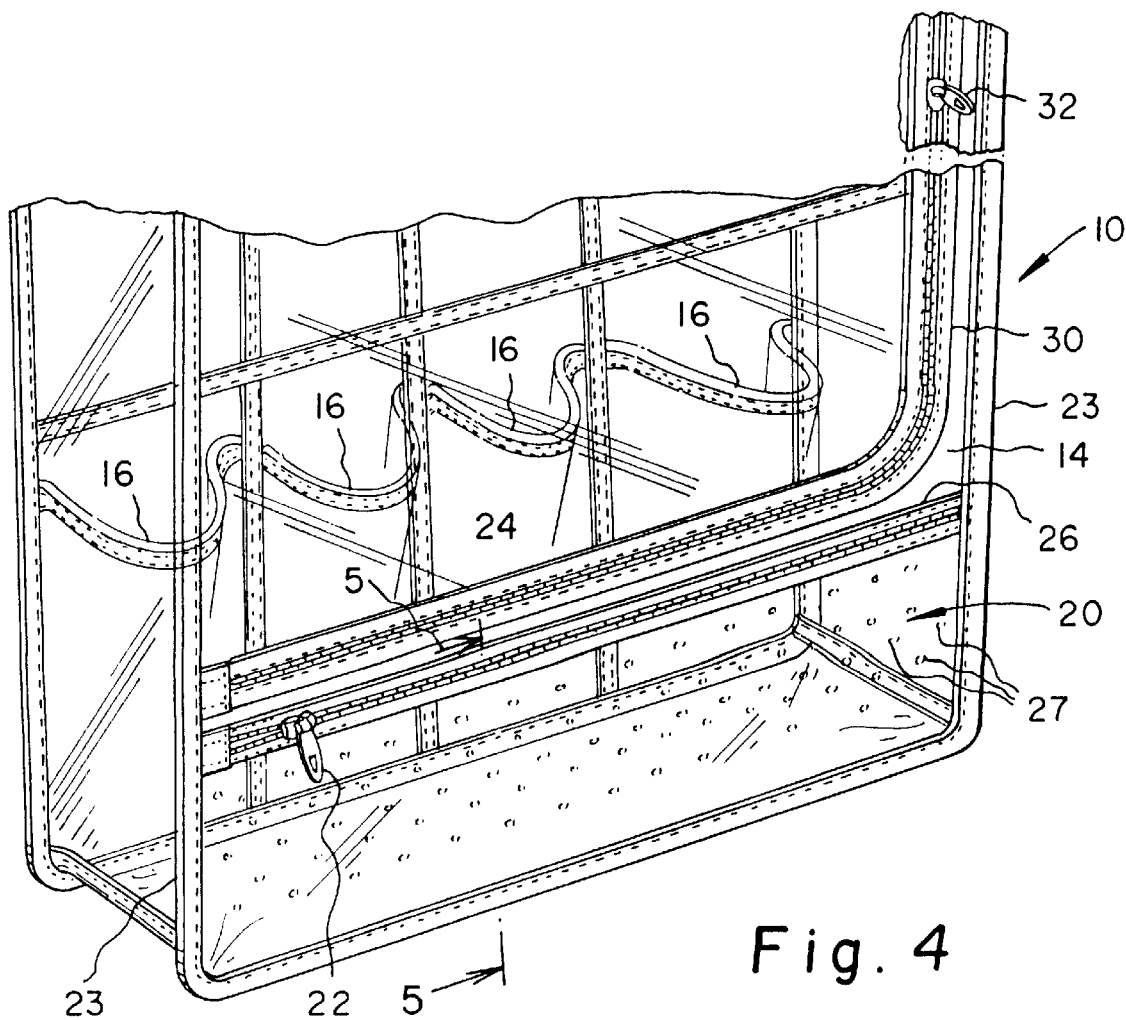
FIG. 4 is a partial bottom frontal perspective view of the hanging multiple shoe rack bag according to the second embodiment with a pocket installed in a bottom front panel.

In FIG. 4, there is shown a partial bottom frontal perspective view of the bag 10 with a remainder of the pathway 30 for the second zipper 32 to run along the right side edge 23 and a bottom edge 24 so that the user may obtain access to shoes (not shown) in a bottom row of the racks 16.

Also, there is shown in FIG. 4 a detailed view of the pocket 20 which may be either partially or completely filled with moth balls or crystals. In this second embodiment, the pocket 20 is empty. Note that the first zipper 22 is secured along the top end edge 26 which runs parallel to the bottom edge 24 of the front panel 14 between the side edges 23. Vents 27 are seen inside the pocket 20.

Figure 5:
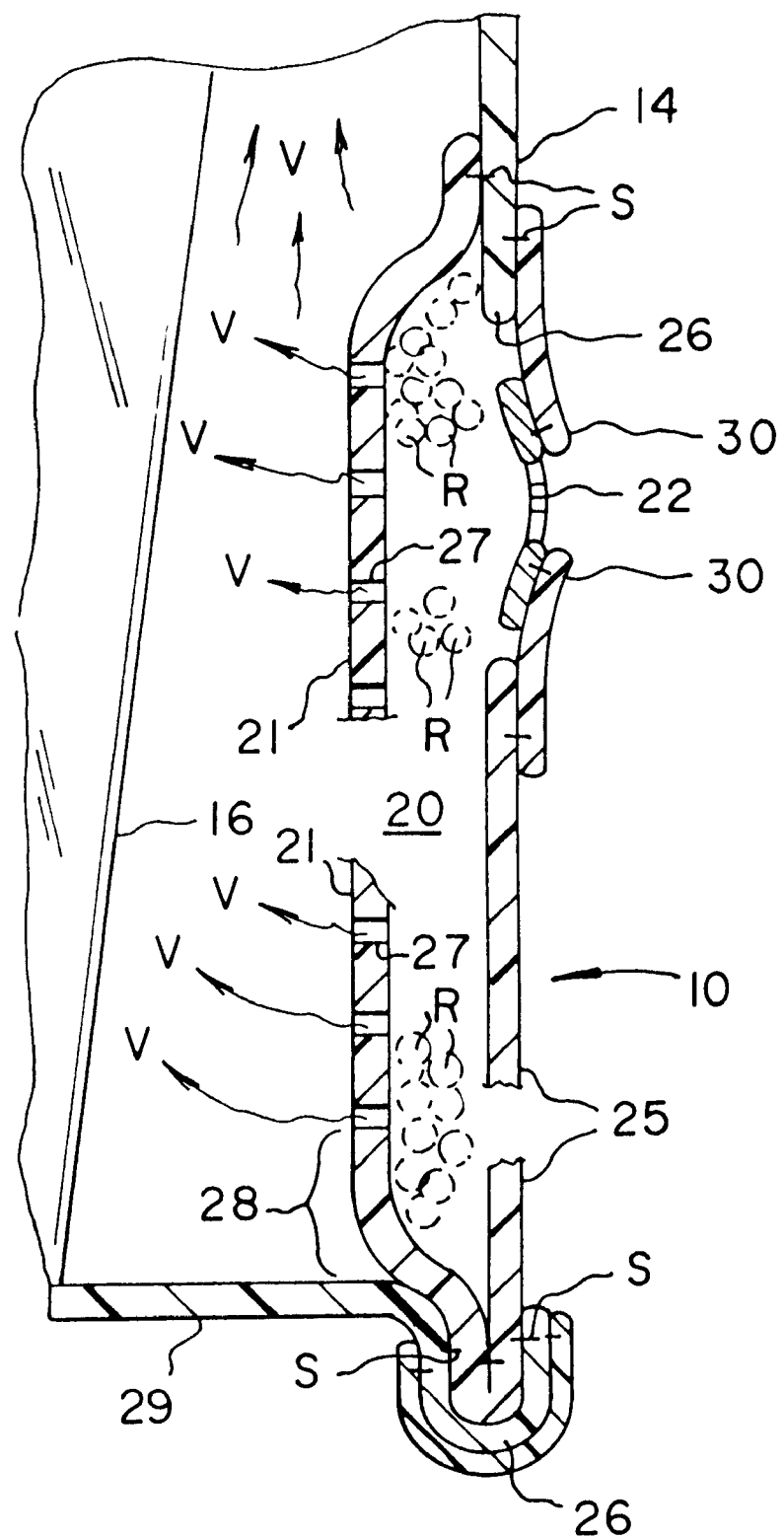
FIG. 5 is a cross-sectional view of the pocket taken along line 5—5 in FIG. 4.

In FIG. 5, a cross-sectional view taken along line 5—5 in FIG. 4 shows the pocket 20 with the first zipper 22 sewn into the pathway 30. The pocket 20 is placed in the opening at the bottom of the front panel 14 and is sewn therein by stitches S along the top edge 26 and the parallel bottom edge 26. The pocket 20 is configured to hold moth balls or crystals R placed inside the pocket 20. The chemical compositions of the moth balls or crystals R are allowed to evaporate so that vapor V passes through the vents 27 perforated in a back surface 21 of the pocket 20. The vapor V cannot escape through the first zipper 22 and a clear front surface 25 for viewing the crystals R because the front surface 25 is made of a gas-impermeable material, such as polyethylene. The vapor V surrounds, protects and treats shoes in the racks 16 and any other goods which may be placed in the racks 16. Eventually, the vapor V escapes whenever the user unzips the second zipper 32 (not shown in FIG. 5 but see FIGS. 2–4). Thus, the owner needs to replenish the pocket 20 with fresh moth balls or crystals R from time to time. A lowermost strip 28 of the back surface 21 is unperforated so that any dissipated moth balls or crystals R may accumulate in a bottom portion of the pocket 20 without becoming so small that they pass through the vents 27 and soil the shoes in the racks 16 whenever the bag 10 is moved. Thus, the owner of the bag 10 may completely fill the pocket 20 with moth balls or crystals R so that more time elapses before he or she needs to replenish the pocket 20.

An underbed storage box of a third embodiment (not shown) may have the pocket 20 extending from a top edge (not shown) to the bottom edge 26 of a side panel 29. There are two advantages of this arrangement. First, the owner of the storage box can completely refill the pocket 20 without the need to remove the box from under a bed. He or she does so merely by unzipping the pocket 20 along a bottom edge of the bed and placing fresh moth balls therein. Second, the manufacturer can save additional time, material and labor costs in making the box because the bottom edge 26 of the side panel 29 also serves as the bottom edge 26 of the pocket 20.

A modified underbed storage box of a fourth embodiment with the pocket 20 installed in the side panel 29 may have a strap handle (not shown) in place of the hook 46 in FIG. 3 so that the box may be pulled out from underneath a bed by its owner from one end of the bed instead of from a side of the bed. Thus, the owner's choice of either location for the strap may depend upon the available floor space next to the bed in the owner's sleeping quarters.

Also, there may be a portable shoe rack closet (not shown) of a fifth embodiment with the pocket 20 installed completely across the front panel 14 made of gas-impermeable material. Accordingly, the moth balls or crystals R may be placed in the pocket 20 so that their vapors V may have better access to the shoes 12 or other items placed in the racks 16. The portable shoe rack closet may have four wheels (not shown) which permit the owner to push or pull the shoe rack closet from one corner to another corner in a room or from room to room, as needed.

While five embodiments of a multiple shoe rack bag have been described, it is understood that the invention is not limited thereby but rather encompasses other modifications. For example, the pocket 20 may be formed in any shape and may be placed in any panel of the bag 10, box or portable closet. Also, the plurality of panels may be only a front panel 14 and a back panel. Likewise, the plurality of panels may number at least six, as in the rectangular boxes and the portable shoe rack closet.

In all cases, the accompanying claims define the scope of the invention and the foregoing embodiments are merely illustrative examples thereof.

I claim:

1. A multiple shoe rack bag comprising:

a plurality of panels, at least one of which has an opening formed therein, said panels forming a space enclosing at least one rack capable of containing at least one pair of shoes therein;

a pocket installed in a front bottom of the bag and configured to hold a chemical composition in an interior thereof;

a first zipper for providing access into the interior of the pocket, said first zipper being arranged along a top edge of the pocket;

said pocket having a gas-impermeable front surface and a back surface, said back surface being perforated with vents to allow vapor from the chemical composition to pass therethrough into the space formed by the panels.

2. A shoe rack bag according to claim 1, wherein: said plurality of panels form a rectangular hanging bag for at least a single pair of shoes.

3. A shoe rack bag according to claim 1, wherein: said plurality of panels form a rectangular hanging bag for multiple pairs of shoes.

4. A shoe rack bag according to claim 1, wherein: said plurality of panels form a portable closet.

5. A shoe rack bag according to claim 1, wherein: said first zipper is arranged between side edges of the pocket.

6. A shoe rack bag according to claim 1, wherein: at least one side edge of the pocket coincides with at least one side edge of one of the plurality of panels.

7. A shoe rack bag according to claim 1, wherein: two side edges of the pocket coincide with two side edges of one of the plurality of panels.

8. A shoe rack bag according to claim 1, wherein: said pocket extends completely across one of the plurality of panels.

9. A shoe rack bag according to claim 1, wherein: each of said plurality of panels is gas-impermeable.

10. A shoe rack bag according to claim 1, wherein: said pocket is aligned in a direction perpendicular to at least one rack.

11. A shoe rack bag according to claim 1, wherein: said plurality of panels is two.

12. A shoe rack bag according to claim 1, wherein: said plurality of panels is six.

13. A shoe rack bag according to claim 1, wherein: said pocket is installed in the opening by stitches.

14. A shoe rack bag according to claim 1, further comprising:

a handle attached to one of the plurality of panels.

15. A shoe rack bag according to claim 1, further comprising:

means for providing access into the space formed by the plurality of panels.

16. A shoe rack bag according to claim 15, wherein: said means for providing access into the space is a second zipper.

* * * * *